(12) United States Patent
Kushida et al.

(10) Patent No.: US 7,173,768 B2
(45) Date of Patent: Feb. 6, 2007

(54) ZOOM LENS AND IMAGE PICKUP APPARATUS

(75) Inventors: Taro Kushida, Nagano (JP); Akiyoshi Wakafuji, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/292,539

(22) Filed: Dec. 2, 2005

(65) Prior Publication Data

US 2006/0238886 A1    Oct. 26, 2006

(30) Foreign Application Priority Data

Apr. 25, 2005   (JP) .............................. 2005-127196

(51) Int. Cl.
*G02B 15/14*    (2006.01)

(52) U.S. Cl. ...................... 359/676; 359/683; 359/684; 359/685; 359/686; 359/714; 359/740; 359/763; 359/695

(58) Field of Classification Search ................ 359/676, 359/683–686, 714, 740, 763, 694–697
See application file for complete search history.

(56) References Cited

U.S. PATENT DOCUMENTS

| | | | | |
|---|---|---|---|---|
| 6,754,446 B2* | 6/2004 | Hagimori et al. | ........... | 359/676 |
| 7,110,186 B2* | 9/2006 | Sueyoshi | .................... | 359/676 |
| 2004/0051960 A1* | 3/2004 | Mihara | ....................... | 359/686 |
| 2005/0007678 A1* | 1/2005 | Sueyoshi | .................... | 359/683 |

FOREIGN PATENT DOCUMENTS

| | | |
|---|---|---|
| JP | 5215967 | 8/1993 |
| JP | 2002156581 | 5/2002 |
| JP | 2003202500 | 7/2003 |
| JP | 2004354869 | 12/2004 |
| JP | 2004354871 | 12/2004 |

* cited by examiner

*Primary Examiner*—Evelyn A. Lester
(74) *Attorney, Agent, or Firm*—Pamela R. Crocker (57) ABSTRACT

A zoom lens has first to fifth lens groups G1 to G5 having positive, negative, positive, positive, and negative refractive power, in order from an object side. The first lens groups G1 includes a prism L2 for bending a light path. Zooming is performed by adjusting a focal length by linear movement of the second lens group G2 and fourth lens group G4 and compensating an image surface position by nonlinear movement of the fifth lens group G5. Focusing is performed by moving the fifth lens group G5.

10 Claims, 10 Drawing Sheets

ZOOM LENS AND IMAGE PICKUP APPARATUS

FIELD OF THE INVENTION

The present invention relates to a zoom lens and an image pickup apparatus using the zoom lens as an image pickup lens, and in particular to a zoom lens and image pickup apparatus including five lens groups.

BACKGROUND OF THE INVENTION

Conventional image pickup (image capturing) apparatuses such as digital cameras and digital video cameras are now in wide use by consumer households. There has therefore in recent years developed a strong desire that image pickup apparatuses be made smaller without sacrificing optical performance. Because a zoom lens mounted on an image pickup apparatus is, in particular, a proportionally large element in the image pickup apparatus, miniaturization of the zoom lens very significantly influences miniaturization of the overall image pickup apparatus. For that reason, a number of techniques relating to the miniaturization of the zoom lens have been proposed.

As one example, Japanese Patent Laid-Open Publication No. 2003-202500 discloses a zoom lens whose light path is bent by an optical element such as a prism to reduce its overall length. This zoom lens includes first to fourth lens groups having refractive powers of positive, negative, positive, and positive, in order from an object side, wherein the first lens group includes a single lens having negative refractive power, the prism for bending the light path and a single lens having positive refractive power. This zoom lens performs zoom operation by movement of the second and fourth lens groups.

Japanese Patent Laid-Open Publication No. 2004-354869 also discloses a zoom lens including an optical element for bending the light path. This zoom lens includes first to fifth lens groups having refractive powers of positive, negative, positive, positive and negative, in order from the object side, wherein the first lens group includes the prism for bending the light path. This zoom lens performs zooming by moving the second and fourth lens groups and performs focusing by moving one of the fourth and fifth lens groups.

The techniques according to Japanese Patent Laid-Open Publication No. 2003-202500 and Japanese Patent Laid-Open Publication No. 2004-354869 can significantly reduce the overall length of the zoom lens. However, both the techniques of Japanese Patent Laid-Open Publication No. 2003-202500 and Japanese Patent Laid-Open Publication No. 2004-354869 perform zooming by moving the second and fourth lens groups. With such a configuration, it is necessary to move one or both of the second and fourth lens groups nonlinearly, which introduces a problem that movement control and a movement mechanism of the lens groups become complicated.

From their disclosures, it is clear that Japanese Patent Laid-Open Publication No. 2003-202500, and Japanese Patent Laid-Open Publication No. 2004-354869 all focus on improvement in performance capabilities in regards to zooming, but neglect consideration of improvement in performance capabilities in regards to focusing. More specifically, Japanese Patent Laid-Open Publication No. 2003-202500 nowhere refers to the focusing operation, while Japanese Patent Laid-Open Publication No. 2004-354869 simply states that the fourth or fifth lens group is moved during focusing, without anywhere describe the specific contents thereof. No reference shows any consideration given to improving the form of a lens group capable of improving focusing characteristics such as, for example, imaging performance and focusing speed.

SUMMARY OF THE INVENTION

A zoom lens according to the present invention comprises a first lens group having positive refractive power and including an optical element for bending a light path, a second lens group having negative refractive power, a third lens group having positive refractive power, a fourth lens group having positive refractive power and a fifth lens group having negative refractive power, that in order from an object side. The zoom lens performs zooming by moving the second, fourth, and fifth lens groups, and performs focusing from an infinitely distant object to a closely located object by moving the fifth lens group towards an image surface side.

According to one aspect of the present invention, on zooming, a focal length is changed by linear movement of the second and fourth lens groups, and a compensation is made by nonlinear movement of the fifth lens group as to deviation of an image surface position in conjunction with the change of the focal length.

According to another aspect of the present invention, movement means for moving the second and fourth lens groups are further provided. The movement means comprise a single motor and a transfer mechanism for transferring a driving force of the motor to each of the second and fourth lens groups as linear straight-line motion of different moving directions and travel distances. The transfer mechanism is a shaft for rotating in conjunction with rotation of the motor, and should desirably include a shaft having a first male thread and a second male thread having a thread direction and lead amount different from those the first male thread formed thereon, a first movable body threadably mounted by the first male thread of the shaft and physically connected to the second lens group, and a second movable body threadably mounted by the second male thread of the shaft and physically connected to the fourth lens group.

According to a further aspect of the invention, the relationship $2.2 < |D2/D4| < 5.0$ is satisfied when a stroke from a short focal length end to a long focal length end of the second lens group is D2 and a stroke from a short focal length end to a long focal length end of the fourth lens group is D4.

According to a still further aspect of the present invention, of the relationship $nd2 > 1.78$, $vd2 < 26.5$ is satisfied when a refractive index of the optical element for bending a light path is nd2 and its Abbe number is vd2.

According to a still further aspect of the present invention, the fifth lens group consists of one single lens having negative refractive power. It is desirable that either the object side or the image surface side of the single lens of the fifth lens group be aspheric, and further desirable that the single lens of the fifth lens group satisfies of the relationship $vd5 < 30.0$ when the Abbe number of a line d is vd5.

An image pickup apparatus including a zoom lens according to the present invention may comprise a first lens group having a positive refractive power and including an optical element for bending a light path; a second lens group having a negative refractive power; a third lens group having a positive refractive power; a fourth lens group having a positive refractive power; and a fifth lens group having a negative refractive power, in order from an object side, wherein the zoom lens performs zooming by moving the second, fourth, and fifth lens groups, and performs focusing from an infinitely distant object to a closely located object by moving the fifth lens group towards an image surface side.

DETAILED DESCRIPTION OF THE INVENTION

Figure 1:
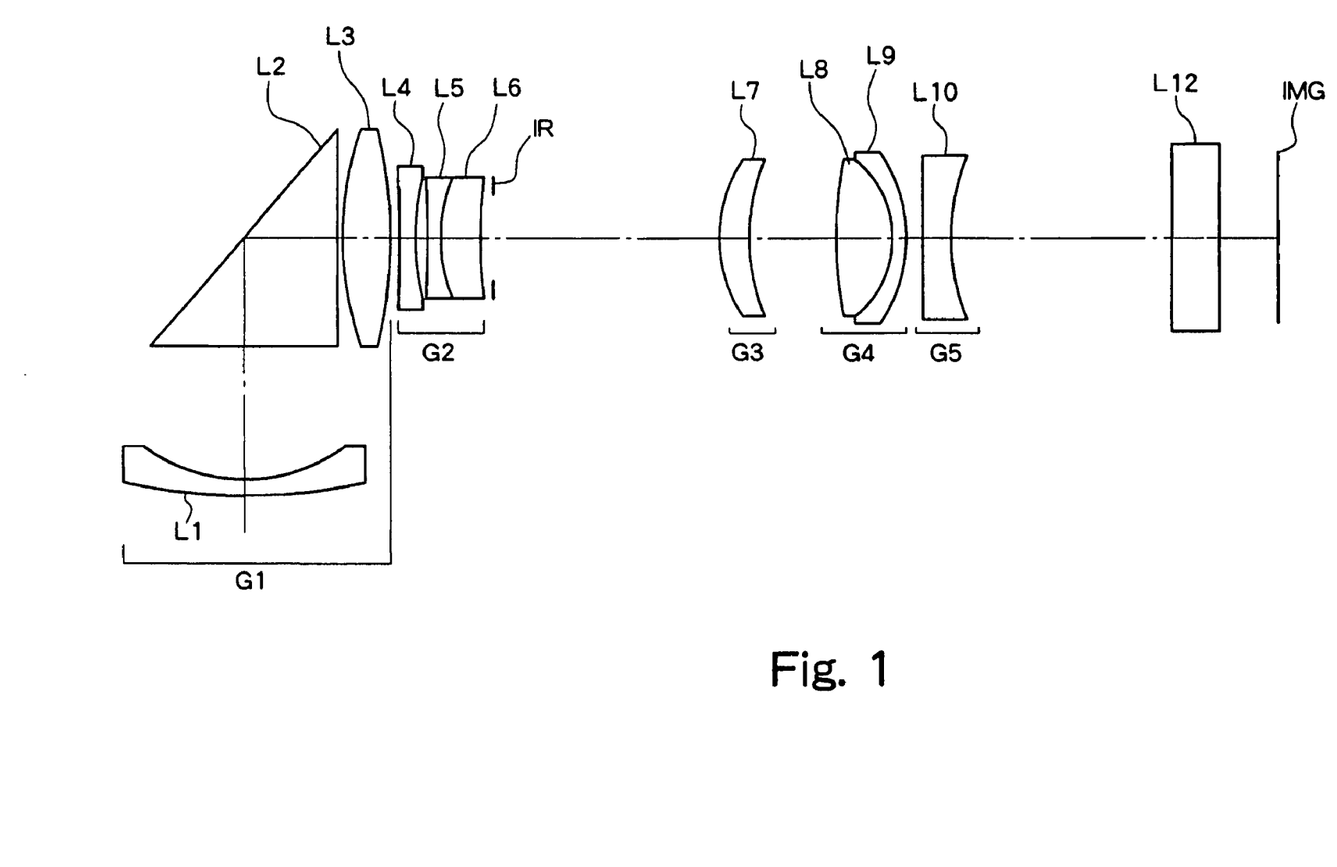
FIG. 1 is a diagram showing a schematic configuration of a zoom lens according to a first embodiment of the present invention.
Figure 2:
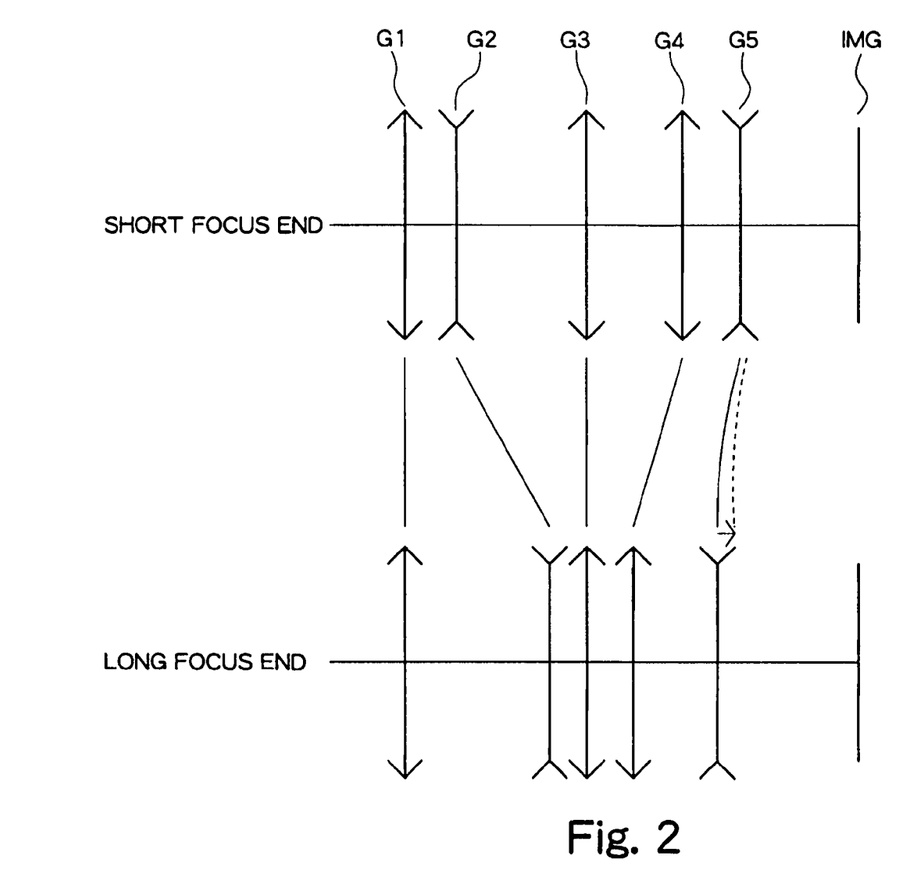
FIG. 2 is a diagram showing an example zooming operation of a zoom lens.

A preferred embodiment of the present invention will be described below with reference to the drawings. FIG. 1 is a schematic configuration diagram of a zoom lens according to an embodiment of the present invention. FIG. 2 is a diagram showing an appearance of zooming operation of the zoom lens. The zoom lens is suitable for photography applications, such as the lens of a digital still camera, for example. The configuration according to the present embodiment is capable of achieving superior optical characteristics over the range of a field angle of 55 to 65 degrees, an f-number of F3.5 to F4.2 or so, and a variable power ratio of 3 to 4.

The zoom lens comprises a first lens group G1 having positive refractive power, a second lens group G2 having negative refractive power, a third lens group G3 having positive refractive power, a fourth lens group G4 having positive refractive power, and a fifth lens group G5 having negative refractive power, in that order from an object side. The third lens group G3 has an aperture IR for adjusting a light volume provided in proximity thereto, and the fifth lens group G5 has an optical low-pass filter L12 and an image obtaining surface IMG (to be more precise, an image pickup device, a film photo surface, and the like) for capturing a subject image focused on the back thereof.

The first lens group G1 is a lens group having an overall positive refractive power. The first lens group G1 comprises an optical element for bending a light path by approximately 90 degrees, in the present example, a glass prism L2. It is possible, by providing the prism L2 and bending the light path by approximately 90 degrees, to significantly reduce overall length of the zoom lens and significantly miniaturize an image pickup apparatus as a result. The glass prism L2 should desirably satisfy the following formulas when the refractive power of the line d is nd2 and the Abbe number is vd2.

Formula 1:

$$nd2 > 1.78 \qquad (1)$$

$$vd2 > 26.5 \qquad (2)$$

Because glass prisms satisfying these condition are available at a relatively low cost, a miniaturized zoom lens and image pickup apparatus can be implemented at a relatively low cost.

As for this zoom lens, zooming is performed by movement of the second lens group G2, fourth lens group G4, and fifth lens group G5 (refer to FIG. 2). More precisely, a focal length is changed by linear movement of the second lens group G2 and fourth lens groups G4, and a compensation is made to the image surface position in conjunction with the change of the focal length by nonlinear movement of the fifth lens group G5 (refer to FIG. 2). More specifically, while the focal length must be changed in order to perform zooming, the image surface position moves when the lens groups are in order to change the focal length. To capture quality photographic images, however, the image surface should be positioned on the image obtaining surface IMG (an image pickup device or a film photo surface for instance). Thus, when zooming, it is necessary to perform focal length change (variator) and image surface position compensation operation (compensator) for compensating deviation of the image surface position in conjunction with the focal length change. According to this embodiment, the focal length change is performed by moving the second lens group G2 and fourth lens group G4, and the image surface position compensation operation is performed by moving the fifth lens group G5. In other words, the focal length change operation and the image surface position compensation operation are completely separate. Further, it is possible, by separating the operations, to simplify the movement of the second lens group G2 and fourth lens group G4 or linearly move them in particular. Thus, it is possible to simplify movement control and a movement mechanism of the lens groups. The movement mechanism of the lens groups will be described in detail below.

When zooming from a short focal length end to a long focal length end, the second lens group G2 linearly moves to the image obtaining surface IMG side, the fourth lens group G4 linearly moves to the object side, and the fifth lens group G5 nonlinearly moves towards, and gradually approaches, the object side. In this case, it is desirable that a movement stroke D2 of the second lens group G2 and a movement stroke D4 of the fourth lens group G4 from the short focal length end to the long focal length end satisfy the following relationship: Formula 2:

$$2.2 < |D2/D4| < 5.0 \quad (3)$$

Establishing this requirement improves imaging performance at middle and long focal lengths. More specifically, if a stroke ratio|D2/D4| between the second lens group G2 and the fourth lens group G4 exceeds an upper limit (5.0) of the formula (3), generation of orbicular zone spherical aberration from the third lens group G3, fourth lens group G4 and fifth lens group G5 becomes so marked at the middle and long focal lengths that aberration compensation is impaired. Consequently, imaging performance is degraded. Inversely, if the stroke ratio|D2/D4| is below a lower limit (2.2) of the formula (3), generation of extrovert coma aberration from the fourth lens group G4 and fifth lens group G5 becomes so marked at the middle and long focal lengths that, again, aberration compensation is compensated and, again, the imaging performance is lowered.

Focusing is performed by moving the fifth lens group G5. To be more precise, focus operation from an infinitely distant object to a closely located object is performed by moving the fifth lens group G5 towards the image obtaining surface IMG side. As already noted, the fifth lens group G5 has a negative refractive power and its imaging longitudinal magnification is positive. It is possible, by performing the focusing by moving the fifth lens group G5, to reduce a focus operation width from long-range object photography to close-range object photography. As the focus operation width is reduced, variation in the aberration becomes less so that good proximity imaging performance can be secured. As the focus operation width becomes smaller, it is also possible to speed up focus driving. To be more specific, it is possible, by performing the focus operation by moving the fifth lens group G5, to improve performance capabilities on focusing.

It is desirable that the fifth lens group G5 comprise a single lens having negative refractive power. By configuring the fifth lens group G5 with a single lens, it is possible to reduce the number of parts, reduce cost, and provide space for other uses. While the fifth lens group G5 is moved in both focusing and zooming, it is possible to reduce the torque required for that movement by configuring the fifth lens group G5 with a single lens. Consequently, it is possible to configure the movement mechanism of the fifth lens group G5 with a relatively small motor.

The single lens of the fifth lens group G5 should desirably be an aspheric lens which is aspheric either on the image obtaining surface side or on the object side. By using the aspheric lens, it is possible to increase zoom magnification and to effectively eliminate off-axis aberrations, such as astigmatism and field curvature. Naturally, an ordinary spherical lens may be used instead of the aspheric lens as the single lens and costs can be greatly reduced by configuring the fifth lens group G5 with an inexpensive spherical lens. In either case, however, it is desirable that the single lens of the fifth lens group G5 satisfy the following relationship when the Abbe number of a line d is vd5:

Formula 3:

$$vd5 \leq 30.0 \quad (4)$$

If the Abbe number vd5 of a single lens L10 of the fifth lens group exceeds 30.0, generation of on-axis chromatic aberration becomes so marked in the entire zoom focal length area that it becomes difficult to make an aberration compensation. Consequently, imaging performance is degraded.

Next, the movement mechanisms of the lens groups G2, G4, and G5 will be described. First, a conventional lens group movement mechanism will be briefly described. In a conventional zoom lens, it is not uncommon for the focal length change operation and the image surface position compensation operation are interrelated. For instance, according to Japanese patent Laid-Open Publication No. 2003-202500 and 2004-354869, the focal length change operation and image surface position compensation operation are simultaneously performed by moving the second lens group and the fourth lens group. For that reason, it is necessary to nonlinearly move one or both of the second lens group and fourth lens group. While Japanese patent Laid-Open Publication No. 2003-202500 and 2004-354869, have no detailed description of the movement mechanism of the second lens group and fourth lens group, two basic methods of nonlinearly moving the two lens groups are possible. One method is to provide a motor to each lens group and nonlinearly move the lens groups by controlling an amount of rotation of each motor. In this case, the configuration can be simplified, but it is necessary to provide multiple expensive motors, undesirably increasing the cost of the apparatus. With this method, it is also necessary to provide sufficient space for installing the multiple motors, which impairs miniaturization. A second method is to use a nonlinear cam for conveying rotational movement of a single motor as nonlinear movement to convey it to the lens groups. However, such a configures requires a complicated cam mechanism, which complicates the configuration of the device and, as with the first method, hinders efforts towards miniaturization of the apparatus.

Figure 3:
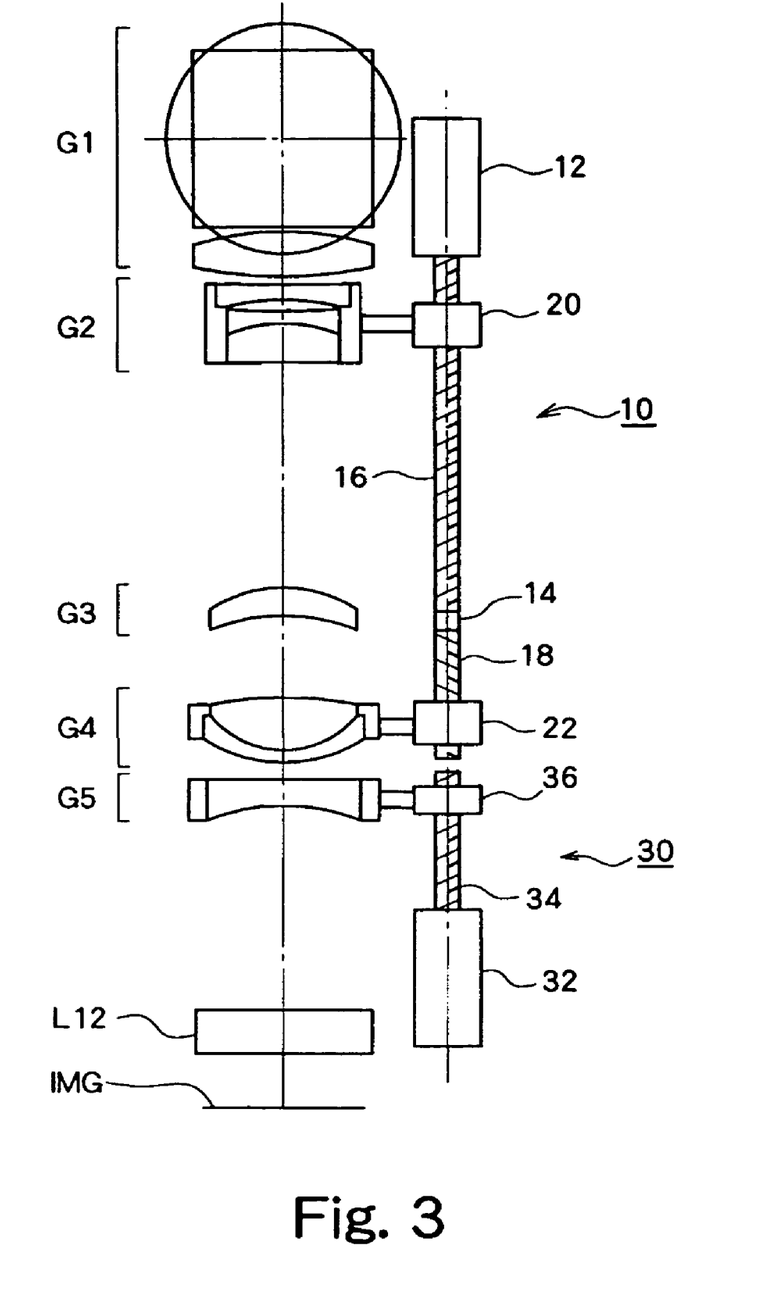
FIG. 3 is a diagram showing lens movement mechanisms according to the present invention.

According to this embodiment, the focal length change operation and the image surface position compensation operation are, as noted, completely separate. In other words, the second lens group G2 and the fourth lens group G4 perform simple linear movement. Therefore, it is possible to move both the lens groups G2 and G4 in a simple and inexpensive configuration. FIG. 3 is a diagram showing movement mechanisms 10 and 30 of the lens groups G2, G4, and G5 according to this embodiment. The zoom lens of this embodiment comprises a linear movement mechanism 10 for moving the second lens group G2 and the fourth lens group G4 and a nonlinear movement mechanism 30 for nonlinearly moving the fifth lens group G5.

First, a the nonlinear movement mechanism 30 for nonlinearly moving the fifth lens group G5 will be briefly described. The nonlinear movement mechanism 30 comprises a single motor 32, a shaft 34 connected to the motor 32, and a transfer block 36 threadably mounted on the shaft 34. The shaft 34 has a male thread formed thereon, and, if the shaft 34 rotates in conjunction with rotation of the motor 32, the transfer block 36 threadably mounted on the shaft 34 moves in a linear manner. A lens drive control portion (not shown) controls the amount of rotation of the motor 32 so as to cause the fifth lens group G5 to move in a nonlinear manner.

Next, the linear movement mechanism 10 for linearly moving the second lens group G2 and the fourth lens group G4 will be briefly described. The linear movement mechanism 10 comprises a single motor 12, a shaft 14 connected thereto, and two transfer blocks 20 and 22 threadably mounted on the shaft 14. The motor 12 is driven according to an instruction from the lens drive control portion (not shown) so as to supply rotational force to the shaft 14. The shaft 14 is placed in parallel with an optical axis, where a first male thread 16 is formed in a portion equivalent to a movement range of the second lens group G2 and a second male thread 18 is formed in a portion equivalent to a movement range of the fourth lens group G4.

The first male thread 16 and second male thread 18 have opposite winding directions. More specifically, if the first male thread 16 has a right handed thread, the second male thread 18 has a left handed thread. The first male thread 16 and second male thread 18 have different lead amounts. Therefore, a leading amount of the first male thread 16 rotated once around the shaft 14 once differs from that of the second male thread 18. A ratio |L1/L2| between a lead amount L1 of the first male thread 16 and a lead amount L2 of the second male thread 18 is the same as a travel distance ratio on zooming between the second lens group G2 and the fourth lens group G4 (=a stroke ratio |D2/D4|. Therefore, for example, if |D2/D4|=3.0, |L1/L2|=3.0.

The first transfer block 20 is threadably mounted by the first male thread 16, and the second transfer block 22 is threadably mounted by the second male thread 18, respectively. The first transfer block 20 is physically connected to the second lens group G2, and the second transfer block 22 is physically connected to the fourth lens group G4, respectively. Consequently, if the shaft 14 rotates due to driving of the motor 12, the first transfer block 20 and second transfer block 22 are provide respective linear driving forces. In this case, because the first male thread 16 and second male thread 18 have opposite thread directions, the threadably mounted first transfer block 20 and second transfer block 22 move in mutually opposite directions, while the second lens group G2 and fourth lens group G4 physically connected to the first transfer block 20 and second transfer block 22 also move in mutually opposite directions. As the first male thread 16 and second male thread 18 have mutually different lead amounts, the first transfer block 20 and second transfer block 22 have mutually different travel distances so that the second lens group G2 and fourth lens group G4 consequently have different travel distances. Consequently, it is possible, simply by driving the single motor 12, to linearly move the second lens group G2 and fourth lens group G4 by desired amounts in desired directions.

To be more specific, according to this embodiment, it is possible, by separating the focal length change operation from the image surface position compensation operation during zooming, to simplify the movement mechanism of the second lens group G2 and fourth lens group G4 and consequently reduce cost and save space. The above-noted linear movement mechanism is just an example, and may, naturally, be in another form, as long as it is capable of linearly moving the second lens group G2 and fourth lens group G4. For example, although the above-described example uses a transfer mechanism comprising the shaft 14 and the transfer blocks 20 and 22, another transfer mechanism may also be used with a configuration capable of transferring a driving force from the single motor to the two lens groups G2 and G4 as the linear movement of different directions and distances. For instance, the transfer mechanism may be configured comprising two types of pinions having mutually different pitches and both connected to a rotation axis of the motor and two kinds of racks engaging with the two kinds of pinions.

Figure 4:
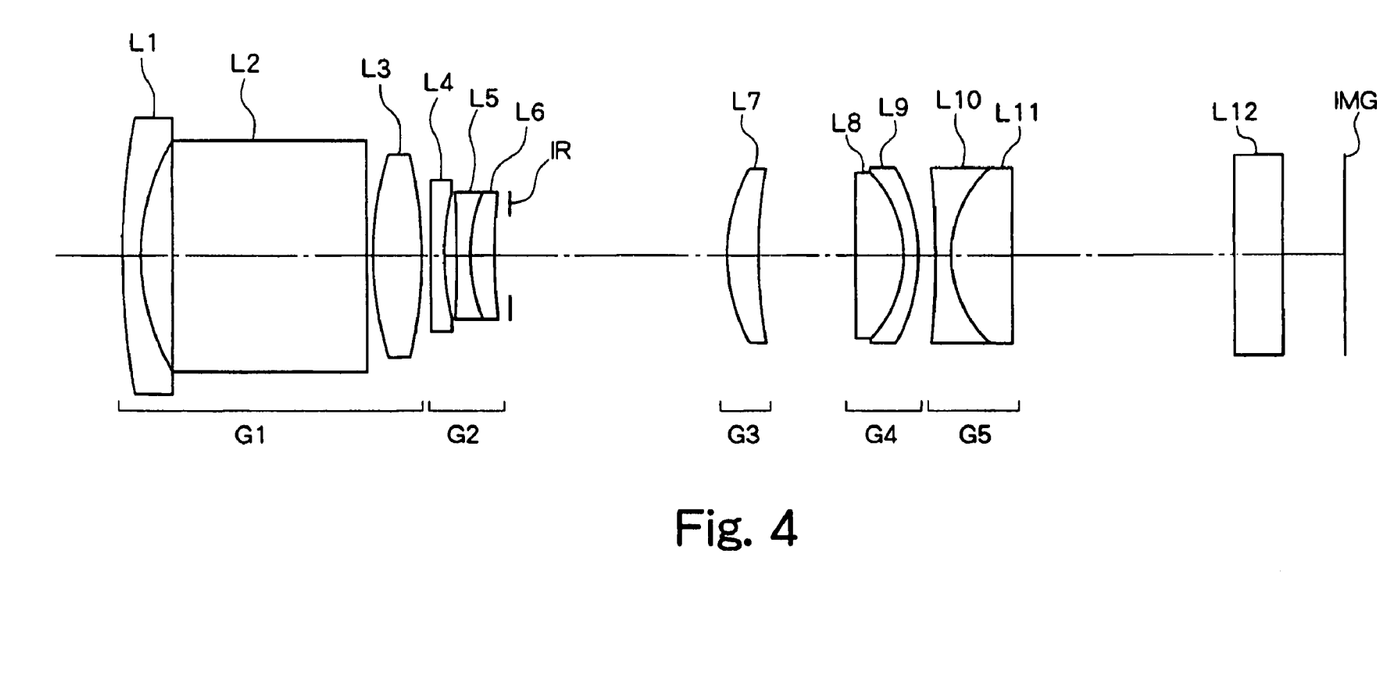
FIG. 4 is a diagram showing a schematic configuration of the zoom lens according to a first example of the present invention.

Next, a more specific example of the zoom lens will be described. FIG. 4 is a diagram showing a lens configuration of the first example. In FIG. 4, reference characters G1 to G5 denote the first to fifth lens groups G1 to G5 having positive, negative, positive, positive and negative refractive power, in order from the object side, respectively. In FIG. 4 L2 denotes a triangular prism as the optical element for bending the light path, and L12 denotes the optical low-pass filter. As is apparent from FIG. 4, according to the first example, the fifth lens group G5 is configured by two lenses L10 and L11 having joined lens surfaces.

Table 1 shows numerical values of the first example. Table 2 shows the values of focal length f, an f-number (Fno) and a field angle 2ω at each focal position of the first example. Table 3 shows aspheric coefficients of the surfaces configured by aspheric surfaces. Table 4 shows a variable air interval at each focal length.

In Table 1, surface numbers S1 to S22 denote incidence planes and outgoing planes of light at central axes of the lenses L1 to L12 (including the prism and low-pass filter), in order from the object side. For example, S1 denotes the lens surface on the object side of the lens L1, and S2 denotes the lens surface on the image surface side of the lens L1.

In Table 2, f denotes the focal length at each focal position, Fno denotes the f-number at each focal position, and 2ω denotes a photography field angle. The form of the aspheric lens is represented by the following formula when a distance in an optical axis direction from a vertex of each aspheric surface is x, a y-axis is in a vertical direction to the optical axis, a paraxial radius of curvature is R, and the aspheric coefficients are CC, A, B, C and D. Moreover, e in the coefficients represents exponential notation. Formula 4:

$$x = \frac{(1/R)y^2}{1 + \sqrt{1 - (1 + CC)(y/R)^2}} + Ay^4 + By^6 + Cy^8 + Dy^{10}$$

In Table 4, D6, D11, D14, D17 and D20 denote the air interval between the lenses L3 and L4, air interval between the lens L6 and an aperture IR, air interval between the lenses L7 and L8, air interval between the lenses L9 and L10, and air interval between the lens L11 and low-pass filter L12.

TABLE 1

| | Surface number | Curvature R | Interval d | Refractive index nd | Abbe number vd |
|---|---|---|---|---|---|
| L1 | S1 | 27.724 | 0.700 | 1.84666 | 23.78 |
| | S2 | 8.092 | 1.362 | | |
| L2 | S3 | ∞ | 8.000 | 1.84666 | 23.78 |
| | S4 | ∞ | 0.200 | | |
| L3 | S5 | 13.491 | 2.000 | 1.69350 | 53.18 |
| | S6 | −17.013 | Variable | | |
| L4 | S7 | −73.135 | 0.550 | 1.81600 | 46.56 |
| | S8 | 10.270 | 0.503 | | |
| L5 | S9 | −33.379 | 0.550 | 1.77250 | 49.61 |
| | S10 | 6.556 | 1.000 | | |
| L6 | | | | 1.84666 | 23.78 |
| | S11 | 23.552 | Variable | | |
| IR | — | — | 1.000 | — | — |
| L7 | S13 | 6.850 | 1.300 | 1.68893 | 31.15 |
| | S14 | 18.602 | Variable | | |
| L8 | S15 | 49.650 | 2.000 | 1.58313 | 59.44 |
| | S16 | −4.761 | 0.600 | | |
| L9 | | | | 1.84666 | 23.78 |
| | S17 | −6.985 | Variable | | |
| L10 | S18 | −34.537 | 0.650 | 1.64769 | 33.83 |
| | S19 | 4.628 | 2.500 | | |
| L11 | | | | 1.55232 | 63.41 |
| | S20 | −250.900 | Variable | | |

TABLE 1-continued

| | Surface number | Curvature R | Interval d | Refractive index nd | Abbe number vd |
|---|---|---|---|---|---|
| L12 | S21 | ∞ | 2.000 | 1.51680 | 64.18 |
| | S22 | ∞ | | | |

TABLE 2

| | Short focal length end | Middle focal length end | Long focal length end |
|---|---|---|---|
| f | 6.54 | 10.75 | 19.60 |
| Fno | 3.6 | 3.74 | 3.97 |
| 2ω | 60.2° | 37.0° | 20.5° |

TABLE 3

| | CC | A | B | C | D |
|---|---|---|---|---|---|
| S5 | 6.4960 | −4.255e−04 | 5.170e−06 | −8.083e−07 | 8.390e−09 |
| S6 | −6.6780 | −2.172e−04 | 2.076e−05 | −1.371e−06 | 4.828e−08 |
| S12 | −0.4240 | −1.530e−04 | 1.423e−05 | −1.781e−06 | 8.778e−08 |
| S15 | −1.0000 | −7.453e−04 | −8.634e−06 | 4.794e−07 | −2.280e−08 |

TABLE 4

| f | D6 | D11 | D14 | D17 | D20 |
|---|---|---|---|---|---|
| 6.54 | 0.400 | 8.569 | 4.000 | 0.700 | 9.017 |
| 8.28 | 2.417 | 6.552 | 3.250 | 1.233 | 9.234 |
| 10.75 | 4.435 | 4.535 | 2.500 | 1.878 | 9.338 |
| 14.34 | 6.452 | 2.517 | 1.750 | 2.609 | 9.358 |
| 19.60 | 8.469 | 0.500 | 1.000 | 3.192 | 9.525 |

Figure 7:
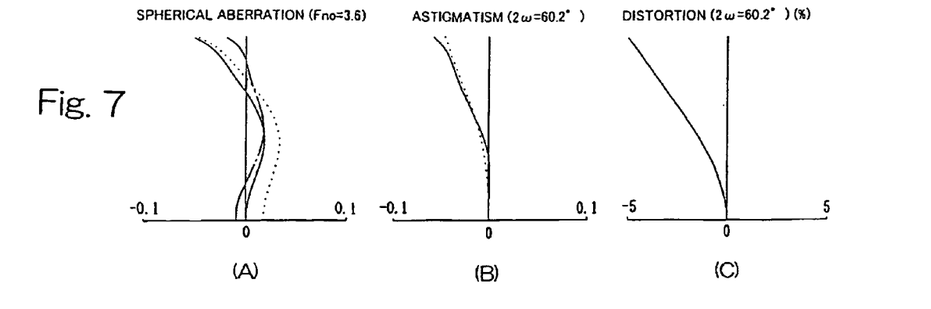
FIG. 7 are aberration diagrams of surfaces at a short focal length end according to the first example of the present invention.
Figure 8:
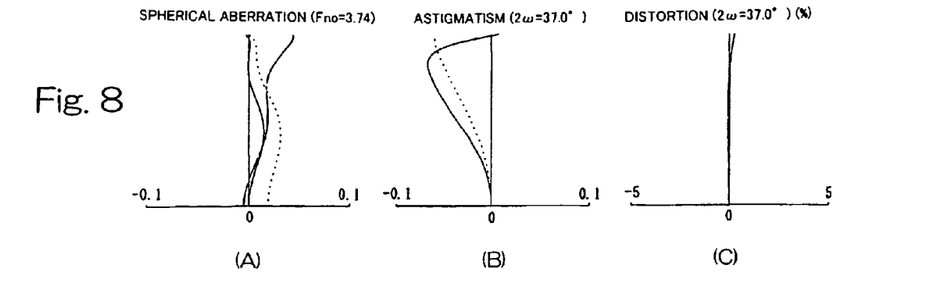
FIG. 8 are aberration diagrams of surfaces at a middle focal length end according to the first example of the present invention.
Figure 9:
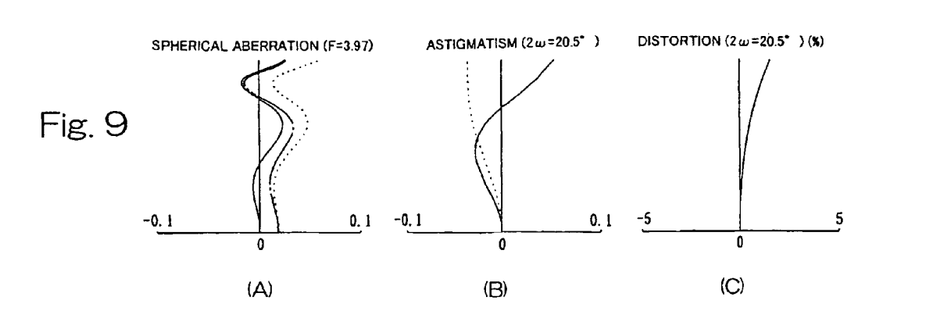
FIG. 9 are aberration diagrams of surfaces at a long focal length end according to the first example of the present invention.

FIGS. 7 to 9 are aberration diagrams of surfaces at the short, middle and long focal length ends of the first example. Here, the spherical aberration is indicated on the left side of each drawing, where a vertical axis indicates a ratio with an open F value and a horizontal axis indicates a focus amount. A solid line indicates the spherical aberration of a line d, a dashed line indicates the spherical aberration of a line F, and a broken line indicates the spherical aberration of a line C. Astigmatism is indicated at the center of each drawing, where the vertical axis indicates image height, the horizontal axis indicates the focus amount, the solid line indicates the value of a tangential image surface, and the broken indicates the value of a sagittal image surface. Furthermore, distortion aberration is indicated on the right side of each drawing, where the vertical axis indicates the image height and the horizontal axis indicates the ratio (%). This also applies to FIGS. 10 to 12 and FIGS. 13 to 15 referred to below.

Figure 5:
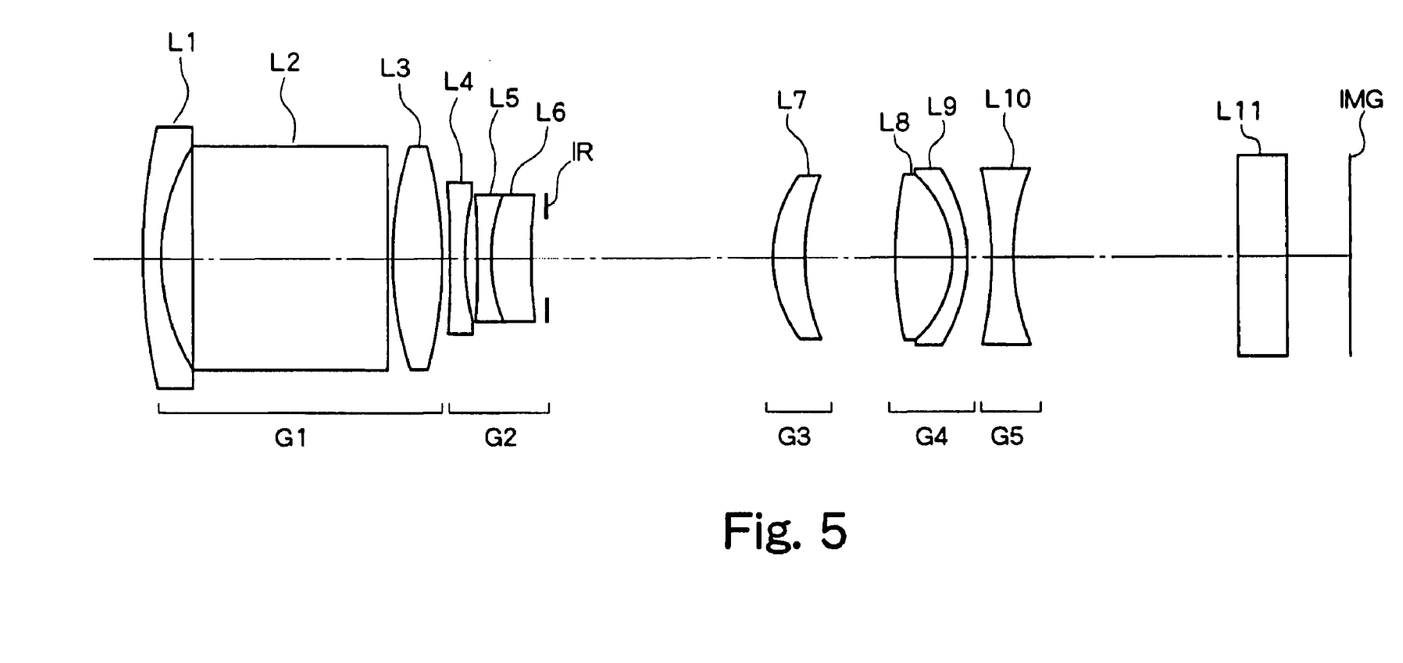
FIG. 5 is a diagram showing a schematic configuration of a zoom lens according to a second example of the present invention.

Next, a second example configuration will be described. FIG. 5 is a diagram showing the lens configuration of the second example. The second example also comprises the first to fifth lens groups G1 to G5 having positive, negative, positive, positive and negative refractive power, in order from the object side. The first lens group G1 comprises the triangular prism L2 as the optical element for bending the light path, and the optical low-pass filter L11 is provided in front of the image obtaining surface IMG. According to the second example, the fifth lens group G5 is configured by one single lens L10 having two spherical surfaces.

Table 5 shows numerical values of the second example. Table 6 shows the values of focal length f, f-number (Fno), and field angle 2ω at each focal position of the second example, while Table 7 shows the aspheric coefficients of the surfaces configured by the aspheric surfaces. Table 8 shows the variable air interval at each focal length. The symbols used in the tables are the same as those in Tables 1 to 4.

TABLE 5

| | Surface number | Curvature R | Interval d | Refractive index nd | Abbe number vd |
|---|---|---|---|---|---|
| L1 | S1 | 25.733 | 0.700 | 1.84666 | 23.78 |
| | S2 | 8.007 | 1.282 | | |
| L2 | S3 | ∞ | 8.000 | 1.84666 | 23.78 |
| | S4 | ∞ | 0.200 | | |
| L3 | S5 | 14.000 | 2.000 | 1.69350 | 53.18 |
| | S6 | −17.471 | Variable | | |
| L4 | S7 | −44.393 | 0.550 | 1.83500 | 42.97 |
| | S8 | 10.576 | 0.487 | | |
| L5 | S9 | −41.063 | 0.550 | 1.77250 | 49.61 |
| | S10 | 6.517 | 1.700 | | |
| L6 | | | | 1.84666 | 23.78 |
| | S11 | 31.840 | Variable | | |
| IR | — | — | 1.000 | — | — |
| L7 | S13 | 5.755 | 1.300 | 1.68893 | 31.15 |
| | S14 | 9.005 | Variable | | |
| L8 | S15 | 10.349 | 2.400 | 1.58313 | 59.44 |
| | S16 | −4.321 | 0.600 | | |
| L9 | | | | 1.80518 | 25.45 |
| | S17 | −6.509 | Variable | | |
| L10 | S18 | −144.300 | 1.200 | 1.84666 | 23.78 |
| | S19 | 8.699 | Variable | | |
| L11 | S20 | ∞ | 2.000 | 1.51680 | 64.18 |
| | S21 | ∞ | | | |

TABLE 6

| | Short focal length end | Middle focal length end | Long focal length end |
|---|---|---|---|
| f | 6.54 | 10.74 | 19.60 |
| Fno | 3.7 | 3.84 | 4.04 |
| 2ω | 60.0° | 36.5° | 20.4° |

TABLE 7

| | CC | A | B | C | D |
|---|---|---|---|---|---|
| S5 | 5.7509 | −3.614e−04 | 2.454e−06 | −3.811e−07 | 1.581e−09 |
| S6 | −3.3328 | −1.554e−04 | 1.318e−05 | −7.583e−07 | 2.160e−08 |
| S13 | 0.5345 | −5.063e−04 | −2.360e−05 | −1.986e−06 | 6.476e−08 |
| S15 | 2.0998 | −1.768e−03 | −7.933e−07 | −9.848e−08 | −1.966e−08 |

TABLE 8

| f | D6 | D11 | D14 | D17 | D19 |
|---|---|---|---|---|---|
| 6.54 | 0.400 | 9.217 | 3.690 | 0.700 | 9.191 |
| 8.29 | 2.579 | 7.037 | 3.200 | 0.954 | 9.427 |
| 10.74 | 4.758 | 4.858 | 2.709 | 1.267 | 9.605 |
| 14.34 | 6.937 | 2.679 | 2.219 | 1.601 | 9.761 |
| 19.60 | 9.117 | 0.500 | 1.729 | 1.910 | 9.942 |

Figure 10:
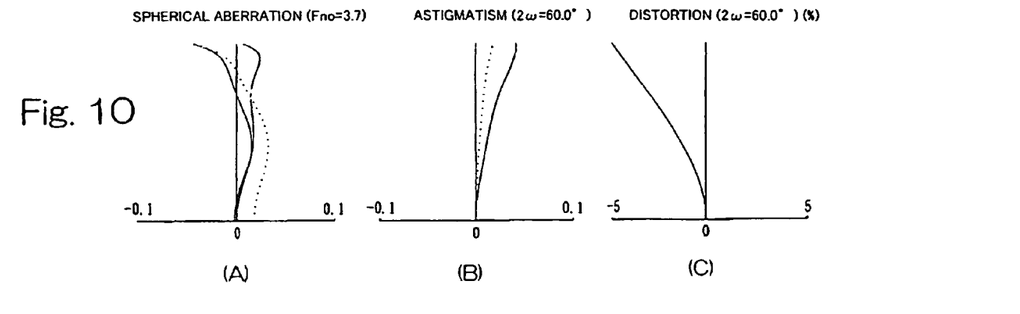
FIG. 10 are aberration diagrams at the short focal length end of the second example of the present invention.
Figure 11:
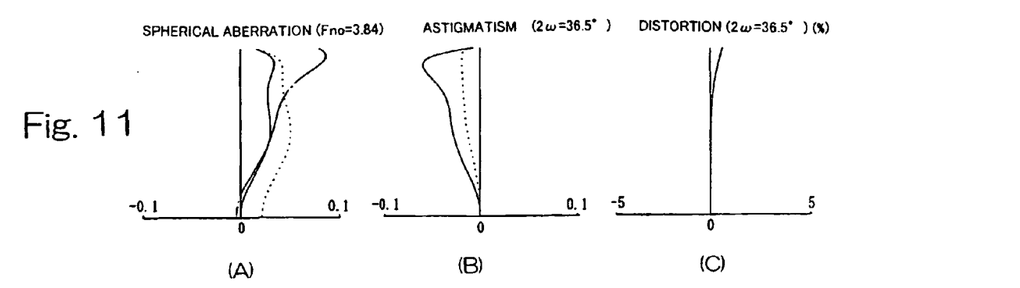
FIG. 11 are aberration diagrams at the middle focal length end according to the second example of the present invention.
Figure 12:
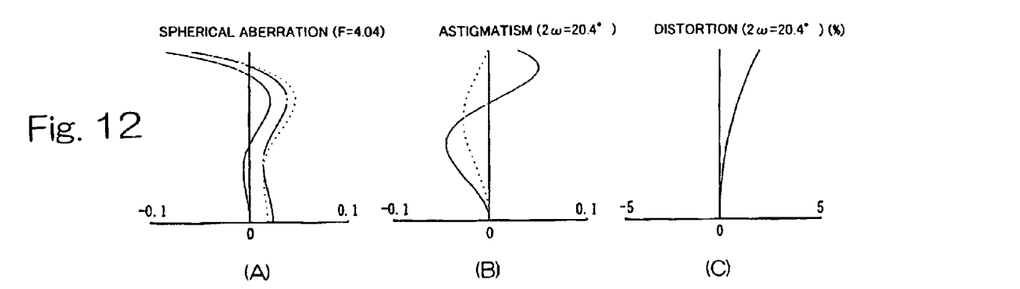
FIG. 12 are aberration diagrams at the long focal length end according to the second example of the present invention.

IGS. 10 to 12 are the aberration diagrams at the short, middle and long focal length ends of the second example.

Figure 6:
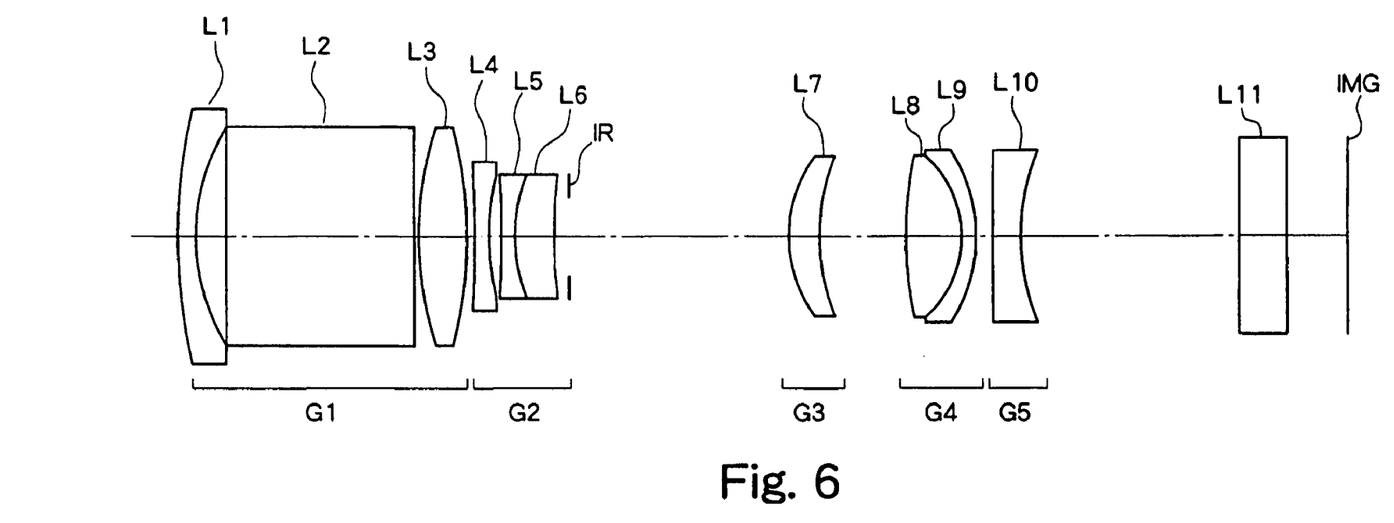
FIG. 6 is a diagram showing a schematic configuration of a zoom lens according to a third example of the present invention.

Next, a third example will be described. FIG. 6 is a diagram showing the lens configuration of the third example. The third example also comprises the first to fifth lens groups G1 to G5 having positive, negative, positive, positive, and negative refractive power, in order from the object side. The first lens group G1 comprises the triangular prism L2 as the optical element for bending the light path, and the optical low-pass filter L11 is provided in front of the image obtaining surface IMG. According to the third example, the fifth lens group G5 is configured by one single lens L10 having an aspheric surface on the image surface side.

Table 9 shows numerical values of the third example. Table 10 shows the values of focal length f, f-number (Fno) and field angle 2ω at each focal position of the third example. Furthermore, Table 11 shows the aspheric coefficients of the surfaces configured by the aspheric surfaces. Table 12 shows the variable air interval at each focal length. The symbols in the tables are the same as those in Tables 1 to 4.

TABLE 9

|  | Surface number | Curvature R | Interval d | Refractive index nd | Abbe number vd |
|---|---|---|---|---|---|
| L1 | S1 | 27.742 | 0.700 | 1.84666 | 23.78 |
|  | S2 | 8.069 | 1.369 |  |  |
| L2 | S3 | ∞ | 8.000 | 1.84666 | 23.78 |
|  | S4 | ∞ | 0.200 |  |  |
| L3 | S5 | 15.285 | 2.000 | 1.69350 | 53.18 |
|  | S6 | −16.088 | Variable |  |  |
| L4 | S7 | −48.338 | 0.600 | 1.83500 | 42.97 |
|  | S8 | 10.664 | 0.463 |  |  |
| L5 | S9 | −45.792 | 0.600 | 1.81600 | 46.56 |
|  | S10 | 6.021 | 1.700 |  |  |
| L5, L6 |  |  |  | 1.84666 | 23.78 |
| L6 | S11 | 30.291 | Variable |  |  |
| IR | S12 |  | 1.000 |  |  |
| L7 | S13 | 5.903 | 1.300 | 1.68893 | 31.15 |
|  | S14 | 9.299 | Variable |  |  |
| L8 | S15 | 11.698 | 2.400 | 1.58313 | 59.44 |
|  | S16 | −4.781 | 0.600 |  |  |
| L9 |  |  |  | 1.80518 | 25.45 |
|  | S17 | −7.440 | Variable |  |  |
| L10 | S18 | −37.584 | 1.200 | 1.82110 | 24.06 |
|  | S19 | 15.489 | Variable |  |  |
| L11 | S20 | ∞ | 2.000 | 1.51680 | 64.18 |
|  | S21 | ∞ |  |  |  |

TABLE 10

|  | Short focal length end | Middle focal length end | Long focal length end |
|---|---|---|---|
| f | 6.54 | 11.70 | 24.48 |
| Fno | 3.83 | 3.99 | 4.22 |
| 2ω | 60.2° | 34.2° | 16.5° |

TABLE 11

|  | CC | A | B | C | D |
|---|---|---|---|---|---|
| S5 | −6.1380 | 1.516e−04 | −9.451e−07 | −3.343e−09 | −3.631e−09 |
| S6 | 6.1240 | 1.617e−04 | 5.028e−06 | −7.939e−08 | 1.602e−09 |
| S13 | 0.6210 | −5.916e−04 | −2.124e−05 | −7.263e−07 | −2.930e−08 |
| S15 | 5.6340 | −1.300e−03 | −3.833e−05 | 2.105e−06 | −1.274e−07 |
| S19 | 3.9640 | −4.354e−05 | −2.284e−05 | 2.052e−06 | −8.758e−08 |

TABLE 12

| f | D6 | D11 | D14 | D17 | D19 |
|---|---|---|---|---|---|
| 6.54 | 0.400 | 11.042 | 4.986 | 0.700 | 11.688 |
| 8.59 | 3.036 | 8.407 | 4.339 | 1.103 | 11.931 |
| 11.70 | 5.671 | 5.771 | 3.693 | 1.610 | 12.071 |

TABLE 12-continued

| f | D6 | D11 | D14 | D17 | D19 |
|---|---|---|---|---|---|
| 16.57 | 8.307 | 3.136 | 3.046 | 2.210 | 12.117 |
| 24.48 | 10.942 | 0.500 | 2.400 | 2.743 | 12.231 |

Figure 13:
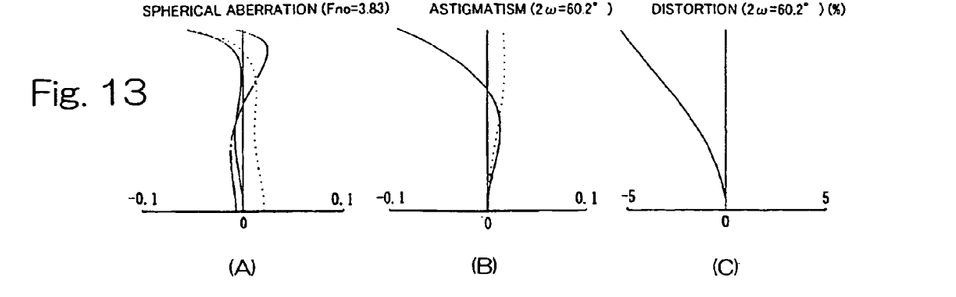
FIG. 13 are aberration diagrams at the short focal length end according to the third example of the present invention.
Figure 14:
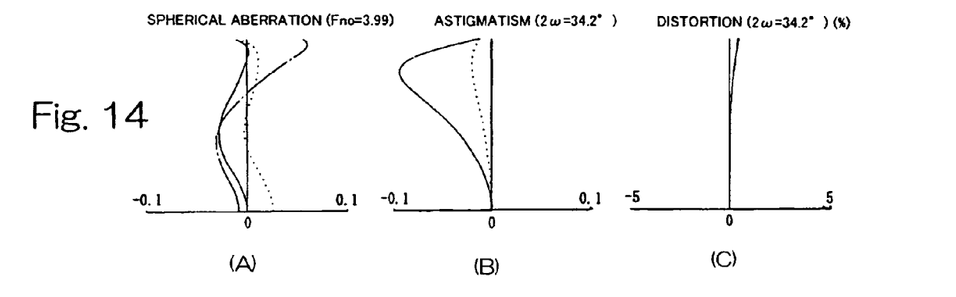
FIG. 14 are aberration diagrams at the middle focal length end according to the third example of the present invention.
Figure 15:
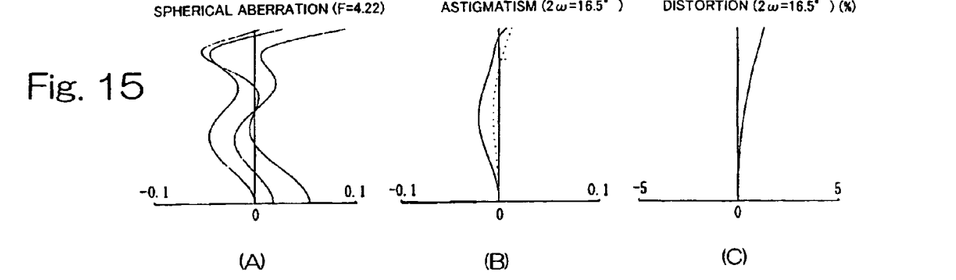
FIG. 15 are aberration diagrams at the long focal length end according to the third example of the present invention.

FIGS. 13 to 15 are the aberration diagrams at the short, middle, and long focal length ends of the third example.

Next, Table 13 shows comparison of parameters prescribed by the formulas (1) to (4) of the examples.

TABLE 13

| Condition expression | First example | Second example | Third example |
|---|---|---|---|
| nd2 | 1.84666 | 1.84666 | 1.84666 |
| vd2 | 23.78 | 23.78 | 23.78 |
| |D2/D4| | 2.69 | 4.44 | 4.08 |
| vd5 | — | 23.78 | 24.06 |

As is apparent in Table 13, all of the first to third examples satisfy the conditions of formulas (1) to (4). From the aberration diagrams of FIGS. 7 to 15, it can be understood that the aberrations in the examples compensated in balance at the short, middle, and long focal length ends. Therefore, it can be assured that preferably imaging performance can be obtained consistently.

Figure 16:
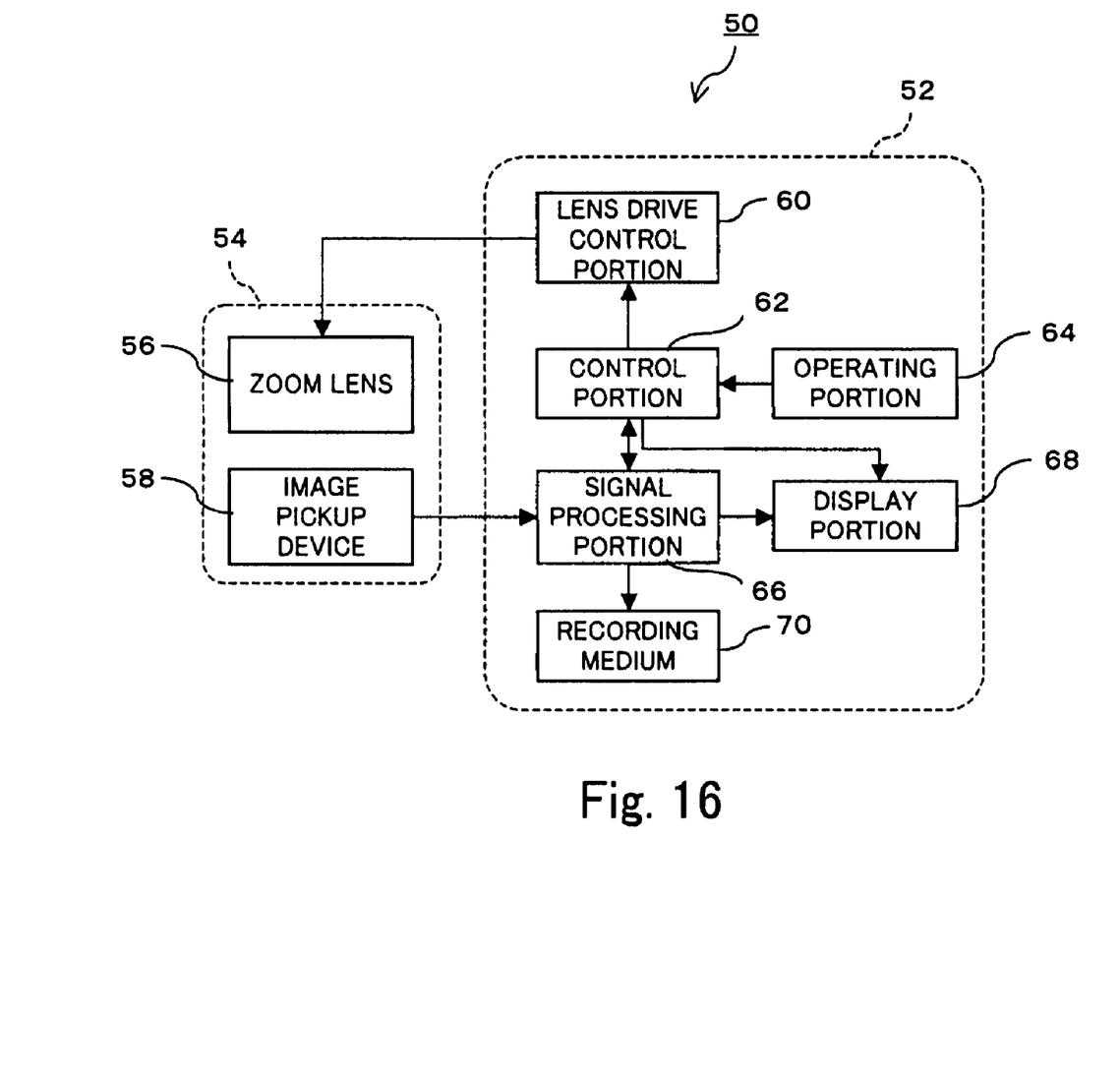
FIG. 16 is a diagram showing a configuration of an image pickup apparatus on which is mounted a zoom lens according to the present invention.

Next, an image pickup apparatus comprising a zoom as described above will be described. FIG. 16 is a diagram showing the configuration of a digital camera 50 having a zoom lens 56 mounted thereon. The digital camera 50 can be roughly divided into a lens block 54 for obtaining an image of a subject and a body portion 52 for performing various processes of imaging signals and exerting various kinds of control necessary for imaging. The lens block 54 comprises the zoom lens 56 consisting of the described five lens groups and an image pickup device 58 for converting a subject image focused by the zoom lens 56 to an electrical signal. The image pickup device 58 outputs the subject image converted to the electrical signal to the body portion 52 as image data.

In the body portion 52, various processes are performed by a control portion 62 in response to user instructions from a user input via an operating portion 64. A signal processing portion 66 performs various types of signal processing, such as A/D conversion and noise reduction, on the image data output from the image pickup device 58. The image data after the signal processing is output to a display portion 68 and a recording medium 70. The recording medium 70 is a data recording medium consisting of a memory card or the like, and the captured image data is recorded thereon. The display portion 68 is a display apparatus such as an LCD, and the user views and confirms the captured image via the display portion 68. When focusing or zooming is required, a lens drive control portion 60 outputs a driving signal to a lens movement mechanism mounted on the zoom lens 56 so as to direct the movement of the lens groups. Then motor of the lens movement mechanism mounted on the zoom lens 56 is driven accordingly, so as to move the lens groups as required.

In this example, because the focusing is performed by moving the fifth lens group G5, focusing can be completed rapidly and it is further possible to improve the imaging performance. Furthermore, because the focal length change operation and the image surface position compensation operation on zooming are separate operations, the movement of the second lens group G2 and fourth lens group G4 can be simple linear movement so that it is possible to drive the lens groups by exerting simple control. The movement mechanism can also be made small, simple, and inexpensive so as to realize a low-cost miniaturized camera.

As is apparent from the above description, according to this example, the focus operation is performed by moving the fifth lens group G5 so that superior proximity imaging performance can be obtained. It is also possible to speed up focus driving. When zooming, the focal length change operation is performed by linearly moving the second lens group G2 and fourth lens group G4, and the image surface position compensation operation is performed by nonlinearly moving the fifth lens group G5 so as to simplify the movement control and the movement mechanism of the lens groups. Consequently, it is possible to reduce cost and further conserve space.

What is claimed is:

1. A zoom lens comprising, in order from the object side:
   a first lens group having a positive refractive power and including an optical element for bending a light path;
   a second lens group having a negative refractive power;
   a third lens group having a positive refractive power;
   a fourth lens group having a positive refractive power; and
   a fifth lens group having a negative refractive power, and wherein:
   zooming is performed by moving the second, fourth, and fifth lens groups and focusing is performed from an infinitely distant object to a closely located object by moving the fifth lens group towards an image surface side.

2. The zoom lens according to claim 1, wherein, when zooming, a focal length is changed by linear movement of the second and fourth lens groups, and a compensation is made by nonlinear movement of the fifth lens group as to deviation of an image surface position in conjunction with the focal length change.

3. The zoom lens according to claim 1, further comprising movement means for moving the second and fourth lens groups, and wherein the movement means comprise a single motor and a transfer mechanism for transferring a driving force of the motor to each of the second and fourth lens groups as straight linear motion of different moving directions and distances.

4. The zoom lens according to claim 3, wherein the transfer mechanism comprising:

a shaft having a first male thread and a second male thread having a threading direction and a lead amount different from the first male thread formed thereon, and rotating in conjunction with rotations of the motor;
   a first movable body threadably mounted by the first male thread of the shaft and physically connected to the second lens group; and
   a second movable body threadably mounted by the second male thread of the shaft and physically connected to the fourth lens group.

5. The zoom lens according to claim 1, wherein of the relationship 2.2<|D2/D4|<5.0, wherein a stroke from a short focal length end to a long focal length end of the second lens group is D2 and a stroke from a short focal length end to a long focal length end of the fourth lens group is D4, is satisfied.

6. The zoom lens according to claim 1, wherein of the relationship nd2>1.78, vd2<26.5, wherein a refractive index of the optical element for bending a light path is nd2 and its Abbe number is vd2, is satisfied.

7. The zoom lens according to claim 1, wherein the fifth lens group consists of one single lens having a negative refractive power.

8. The zoom lens according to claim 7, wherein either an object side or an image surface side of the single lens of the fifth lens group is aspheric.

9. The zoom lens according to claim 7, wherein the single lens of the fifth lens group satisfies of the relationship vd5≦30.0 when the Abbe number of a line d is vd5.

10. An image pickup apparatus including a zoom lens comprising, in order from an object side:
    a first lens group having a positive refractive power and including an optical element for bending a light path;
    a second lens group having a negative refractive power;
    a third lens group having a positive refractive power;
    a fourth lens group having a positive refractive power; and
    a fifth lens group having a negative refractive power, wherein zooming is performed by moving the second, fourth, and fifth lens groups, and focusing is performed from an infinitely distant object to a closely located object by moving the fifth lens group towards an image surface side.

* * * * *